United States Patent [19]

Aldridge

[11] Patent Number: 4,561,797
[45] Date of Patent: Dec. 31, 1985

[54] UNIVERSAL CLEVIS

[76] Inventor: Byron D. Aldridge, 104 Pecanwood Dr., Natchez, Miss. 39120

[21] Appl. No.: 535,585

[22] Filed: Sep. 26, 1983

[51] Int. Cl.⁴ .............................................. F16D 3/00
[52] U.S. Cl. ....................................... 403/58; 403/74; 403/78; 403/164; 172/314; 172/554; 59/86; 59/95
[58] Field of Search ....................... 403/41, 57, 58, 74, 403/78, 79, 164, 165, 64, 72, 152; 59/95, 86; 172/540, 548, 554, 597, 314

[56] References Cited

U.S. PATENT DOCUMENTS

| | | | |
|---|---|---|---|
| 428,799 | 3/1890 | Breul | 403/164 |
| 3,270,494 | 9/1966 | Holmes | 59/86 |
| 3,705,708 | 12/1972 | Conningham | 403/164 |
| 3,918,821 | 11/1975 | Schlegel et al. | 403/57 |
| 4,023,803 | 3/1977 | Lewis | 403/78 |
| 4,078,636 | 3/1978 | Yamanaka | 403/58 |
| 4,365,906 | 12/1982 | King | 403/157 |

FOREIGN PATENT DOCUMENTS 491553 9/1938 United Kingdom ................ 172/540

OTHER PUBLICATIONS

Marden Duplex Brush and Weed Cutters; Marden Mfg. Co., copyright 1949, pp. 3, 4, 5, 6, 7, 9, 11, 14, and 18.

Primary Examiner—Cornelius J. Husar
Assistant Examiner—Todd G. Williams
Attorney, Agent, or Firm—Paul H. Gallagher

[57] ABSTRACT

A pair of knuckles each including a base element and a pair of transversely spaced longitudinally extending lugs on the base element. The lugs on each knuckle are pivoted in a pair of lugs secured to the frame of one of the leading and trailing equipment units, the two knuckles being positioned on relatively transversely positioned axes. The knuckles are interconnected by a longitudinal pin extending through the base elements, the longitudinal pin being dimensioned to enable longitudinal play between the knuckles, and relative angular movement therebetween.

2 Claims, 6 Drawing Figures

U.S. Patent  Dec. 31, 1985  4,561,797
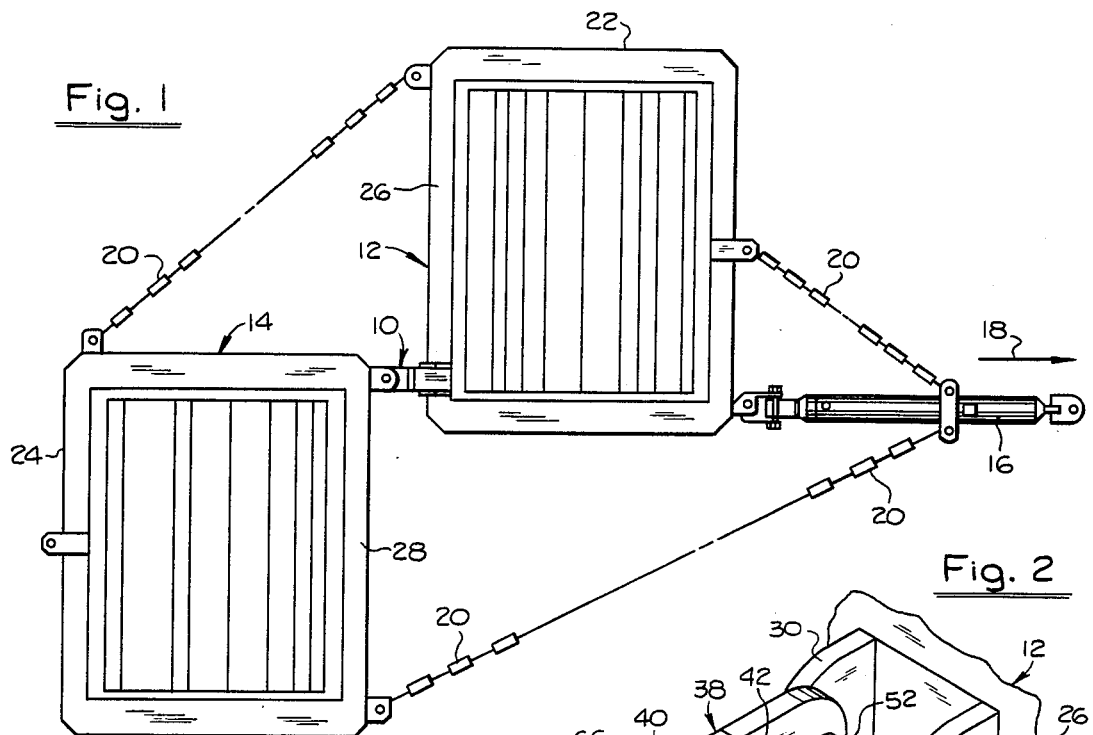
Fig. 1
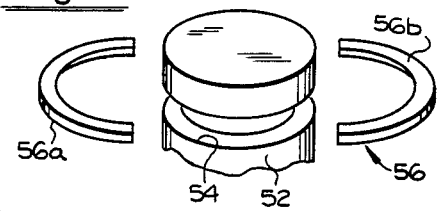
Fig. 2
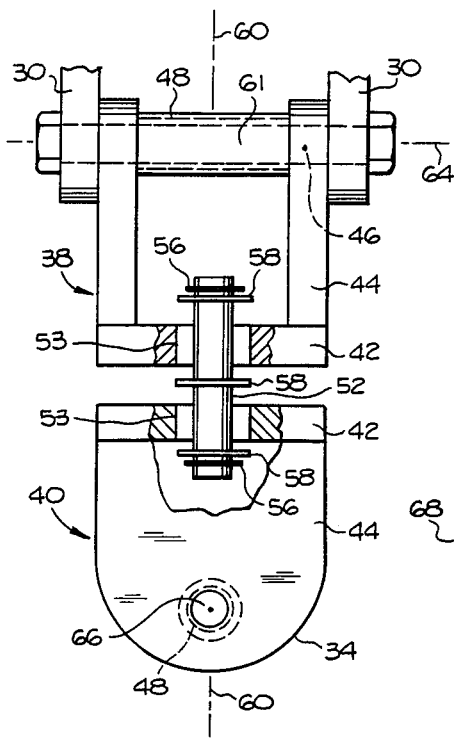
Fig. 3
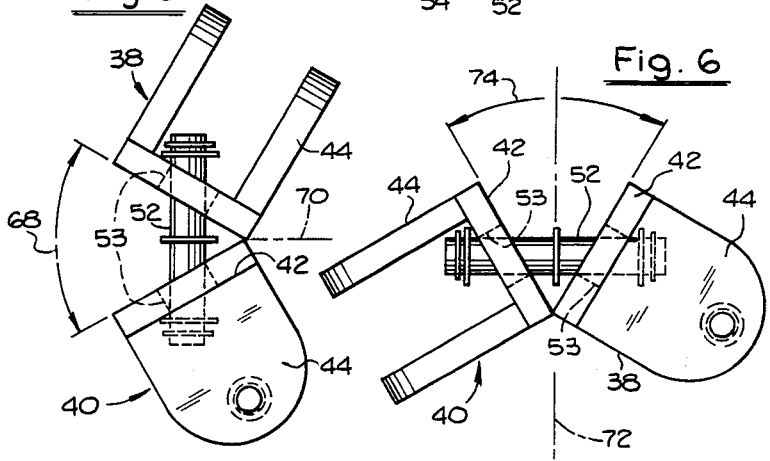
Fig. 4
Fig. 5
Fig. 6

UNIVERSAL CLEVIS

FIELD OF THE INVENTION

In clearing land for reforestation, the equipment used is of very heavy character. Choppers are an example of such equipment. These choppers are usually drawn along the land in tandem arrangement and the land is always rough and uneven, which causes the choppers to move irregularly relative to each other, and the connectors between them heretofore did not allow the desired universal movement between them.

OBJECTS OF THE INVENTION

A broad object of the invention is to provide a universal clevis especially adapted to connection between tandem pieces of heavy equipment having the following features and advantages:

1. It provides maximum kinds of universal relative movement between the pieces.
2. It eliminates that condition where a leading piece of equipment would carry the trailing piece, over rough and uneven ground.
3. It is of simple construction whereby its adaptation to existing equipment is facilitated.
4. Nothwithstanding its simplicity, it is extremely rugged, and capable of withstanding the extreme forces encountered in the use of such heavy equipment referred to.

DESCRIPTION OF A PREFERRED EMBODIMENT

In the drawings,

FIG. 1 is a plan view of a set of pieces of equipment in which the device of the present invention is utilized;

FIG. 2 is a perspective view of the universal clevis of the invention, which is indicated at 10 in FIG. 1;

FIG. 3 is a plan view of the device of the invention;

FIG. 4 is a fragmentary detail perspective view of a connecting pin of the device;

FIG. 5 is a small scale view, oriented according to FIG. 3, showing the knuckles of the clevis in an angular position; and FIG. 6 is a view similar to FIG. 5 but taken at right angles thereto, or oriented as viewed from the right of FIG. 3.

Referring in detail to the accompanying drawings, the universal clevis of the invention is indicated at 10, and in FIG. 1 it is shown in its environment of use. It is shown in perspective view in FIG. 2, with fragments of the pieces of equipment between which it is connected.

FIG. 1 shows two pieces of equipment, or implements, 12, 14 connected together by the universal clevis 10, the leading implement 12 having a tongue 16 by which the implements are drawn, being so drawn in the direction indicated by the arrow 18, or from left to right as viewed in FIG. 1. Suitable chains 20 interconnect various elements in a known manner. The pieces of equipment or implements 12, 14 in the present instance are choppers used in clearing land for reforestation. The ground in such situations is extremely rough; not only is the ground itself usually uneven, but stumps and limbs are encountered on the ground, and the choppers in travelling thereover are subjected to extremely rough usage. These choppers are of immense weight, each being perhaps 20-30 tons in weight, and they move relative to each other to a great degree, due to the unevenness of the ground. They not only move bodily, up and down and sideways, but they also move in angular directions, that is, they assume angular positions relative to each other. These movements, including the angular positioning movements, heretofore were not well accommodated by connectors utilized, but the universal clevis of the present invention effectively accommodates such movements.

The universal clevis 10 of the invention enables universal movement of the parts of the clevis in virtually all directions. Such a device is sometimes known as a universal connector, or universal joint, but in the present industry it is known as a universal clevis. Referring to the specific construction of the universal clevis 10, and its mounting in the choppers, it is pointed out that the choppers 12, 14 include rigid frames 22, 24 respectively, of welded steel pieces. The frame 22 includes a transverse piece 26 at the rear and the frame 24 includes a transverse piece 28 at the front.

The universal clevis 10 is mounted directly to these transverse pieces 26, 28 as illustrated particularly in FIG. 2. The transverse piece 26 of the leading chopper is provided with a pair of transversely spaced, vertical lugs 30 having horizontally aligned apertures 32, and similarly the transverse piece 28 on the trailing chopper is provided with a pair of vertically spaced, longitudinal lugs 34 having vertically aligned apertures 36.

Reference is made to FIGS. 2 and 3 for the detail construction of the universal clevis. The clevis is made up of a pair of knuckles 38, 40 which are essentially identical, and each includes a base element 42 and spaced lugs 44. This base element and lugs are basically platelike pieces, although heavy, and the lugs are welded to the base element. The extended ends of the lugs are provided with apertures 46 and between the lugs is a spacer sleeve 48.

The knuckles 38, 40 are interconnected by a longitudinal pin 52 (see also FIG. 4) which is extended through apertures 53 in the base elements 42 and is preferably of a construction shown in FIGS. 3 and 4. The pin is provided with circumferential grooves 54 adjacent to but spaced from the ends, and in each groove is a split collar 56 made up of opposed halves 56a and 56b, these halves being fitted in the groove and welded therein. Washers 58 are also fitted on the pins, one between each collar and the corresponding base element 42 and one between the two base elements, these washers assuming the thrust and friction, between the various parts.

The longitudinal pin 52 is of such length as to provide substantial play between the knuckles, longitudinally along the axis line 60 and the diameters of the pin 52 and apertures 53 are such as to enable considerable sideways play, and angular displacement as referred to again in connection with FIGS. 5 and 6.

The universal clevis is mounted to the choppers as shown particularly in FIGS. 2 and 3. The lugs 44 on the knuckle 38 are disposed vertically and fitted between the lugs 30 on the chopper, and a pin 61 is inserted through the aligned elements, and nuts 62 are threaded on the ends of the pin. These aligned elements define a horizontal axis 64.

In a similar manner the knuckle 40 is mounted to the trailing chopper 14 by inserting the lugs 44 placed in horizontal position between the lugs 34 on the trailing chopper 14. A pin 61 is fitted through the aligned lugs 34, lugs 44, spacer 48, and then nuts 62 are threaded on the pin. These elements thus assembled define a vertical axis 66.

It will be understood that any of the elements identified above, while not specifically so stated, may be welded together, as desired, and in accordance with surrounding circumstances.

The location of the mounting lugs on the choppers, 30, 34, are also as desired, these being located at respective side edges of the choppers to position the tandem choppers in offset relation, this being according to presently known practice.

The universal clevis 10, thus described, provides ample mutual movement between the knuckles, and between the knuckles and the choppers. Specifically, the knuckle 38 is capable of moving relative to the leading chopper 12 in vertical directions about the horizontal axis 64, and the knuckle 40 is capable of moving relative to the trailing chopper in horizontal directions about the vertical axis 66. The knuckles, and thus the choppers, are provided substantial play toward and from each other longitudinally along the longitudinal axis 60 (FIG. 3).

An additional and important feature of the universal clevis is the angular movement provided between the knuckles. Due to the substantial length of the longitudinal pin 52, the knuckles are capable of substantial angular movement relative to each other and this angular movement can take place in any direction circumferentially around the longitudinal axis 60. FIG. 5 is oriented according to FIG. 3, and thus looking down on the implements, and the knuckles are capable of bending sideways to an angle indicated at 68. Included in FIG. 5 is a reference line 70 indicating horizontal direction, to show angular relative movement between the knuckles in that direction.

FIG. 6 shows the knuckles of the clevis in angular position as viewed from the right of FIG. 3, or looking in horizontal direction. FIG. 6 includes a reference line 72 which is vertically disposed to indicate the angular displacement of the knuckles as viewed horizontally. The angular relation between them is indicated by the angle 74 which may be as great as the angle 64.

Heretofore it was a very common occurrence for the leading chopper or implement to "carry" the trailing chopper at many places along the line of travel, because of the extreme unevenness of the ground. This carrying effect was the result not only of relative up and down movement between the implements, but angular displacement as well, but because of the angular displacement between the knuckles, now accomodated by this clevis, that carrying effect is eliminated or greatly decreased.

The whole construction of the clevis is extremely simple, and rugged and strong. The bodies of the knuckles are made up of the base elements and lugs which are heavy pieces of steel welded together and capable of withstanding extremely rough usage, and they are connected together by the steel longitudinal pin 52 which is held in place by the welded collars 56. These pins and collars are capable of withstanding extremely rough usage. Also the mounting of the lugs 44 on the clevis in the lugs 30, 34 on the implements, is an extremely simple and strong connection, in this case also capable of withstanding extremely rough usage.

I claim:

1. A universal clevis for connection between leading and trailing equipment units, the units being adapted for moving along a line establishing a longitudinal direction, and the units having rigid frames, comprising, a pair of frame lugs rigidly secured to each the rear of the leading unit and the front of the trailing unit, those of each pair being spaced along an axis and the axes being disposed vertically and horizontally respectively, a single clevis unit including a pair of knuckles of rigid construction, each including a base element and a pair of spaced clevis lugs, said knuckles being mounted in respective pairs of said frame lugs with said clevis lugs parallel with said frame lugs, and said knuckles substantially filling the space between respective pairs of frame lugs, and the knuckles being pivoted therein on the respective ones of the vertical and horizontal axes, transverse pins so mounting said knuckles for corresponding pivoting movements, about said axes, said knuckles having their base elements extending and positioned longitudinally outwardly from said frame lugs and being in close juxtaposition, to each other, said clevis unit including a longitudinal pin extending through and interconnecting said base elements, enabling rotation of said knuckles independently about that longitudinal pin, and said longitudinal pin being dimensioned longitudinally relative to said knuckles as to enable longitudinal play between said knuckles along said longitudinal pin, said universal clevis forming with said rigid frames a connection that is rigid except for pivoting movements of said knuckles about said axes, movement of said knuckles toward and from each other along said longitudinal pin, and rotational movement of said knuckles about said longitudinal pin.

2. A universal clevis according to claim 1 wherein, said longitudinal pin is provided with collars adjacent its ends, and with said collars forms a construction member in which the longitudinal pin has grooves formed therein and said collars are welded in said grooves.

* * * * *